Dec. 13, 1927. W. P. MATHEWS Re. 16,815
WOOD SAW ATTACHMENT FOR AUTOMOBILES
Original Filed April 3, 1925
Fig. 1.
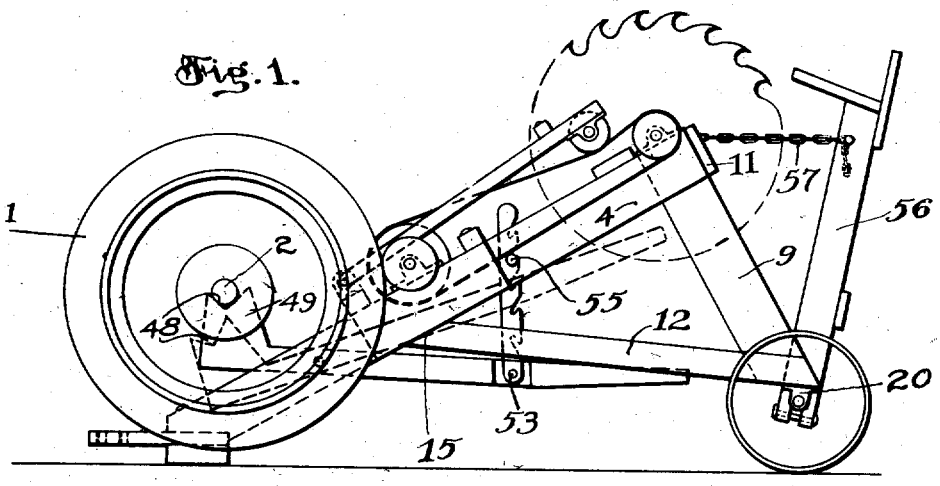
Fig. 2.
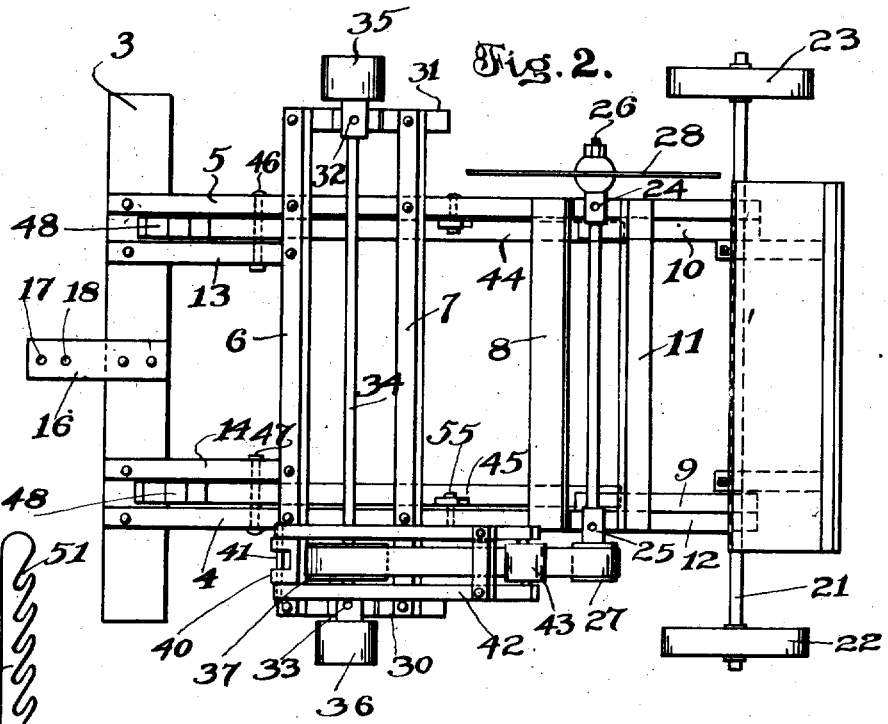
Fig. 3.
INVENTOR.
William P. Mathews
BY Paul Morton
ATTORNEY Reissued Dec. 13, 1927. Re. 16,815

UNITED STATES PATENT OFFICE.

WILLIAM P. MATHEWS, OF KERNERSVILLE, NORTH CAROLINA, ASSIGNOR TO MONARCH MACHINE AND MANUFACTURING COMPANY, OF GREENSBORO, NORTH CAROLINA, A CORPORATION OF NORTH CAROLINA.

WOOD-SAW ATTACHMENT FOR AUTOMOBILES.

Original No. 1,599,909, dated September 14, 1926, Serial No. 20,467, filed April 3, 1925. Application for reissue filed November 8, 1927. Serial No. 231,963.

My invention relates to wood-saw attachments for automobiles and more especially to a wood saw which can be readily attached to and detached from an automobile.

Another object of my invention is to provide a wood saw capable of being driven by the rear wheels of an automobile, and especially, a wood saw in which the rear wheels of the automobile will be held in engagement with the wheels by especially constructed means.

Another object of my invention is to provide in a wood saw attachment for automobiles, means for raising the rear wheels from the ground and pressing said wheels into engagement with pulleys located on the attachment for driving the saw located on the said attachment.

Another object of my invention is to provide means to positively hold the wheels of the automobile in engagement with the pulleys located on the wood saw.

Another object of my invention is to provide a wood saw which can be quickly attached to an automobile for transport and also quickly attached to the wheels of the automobile when it is desired to apply power to the saw.

Having thus stated some of the objects of my invention, a brief description of the different figures in the drawings will now be given.

Figure 1 is a side elevation of my device, showing the wheels of an automobile raised from the ground and held in engagement with the pulleys;

Figure 2 is a plan view of my device;

Figure 3 is a detail view of the notched rack for securing the wheels on the automobile in any desired position.

A brief description of the different figures in the drawings having been given, a detailed description of the drawings will now be given, in which like reference characters represent corresponding parts thruout the drawings.

The numeral 1 indicates the rear wheel of an automobile, while 2 represents the housing for the rear axle of an automobile. The numeral 3 represents the front cross-piece of the device, and extending rearwardly at right angles from the member 3 are the side members 4 and 5, and these side members have the cross members 6, 7, and 8 secured to their upper sides and running from one to the other.

At the rearmost ends of the side members 4 and 5 are secured the downwardly projecting supports 9 and 10. These last named members or supports extend at approximately right angles from the side members. At the junction point of the members 4 and 9 and 5 and 10 there is secured the cross member 11.

At the lowermost portion of the supports 9 and 10 there are secured the braces 12. These braces extend forwardly and connect with the side members 4 and 5 at the point 15.

Secured to the member 3 and extending rearwardly to the cross-member 6 and being secured thereto, are the members 13 and 14, the purpose of said members will be presently explained.

The cross-member 3 has a longitudinally extending member 16 secured to its central portion, said member 16 having holes 17 and 18 therein, for receiving any desired means for attaching the device to an automobile for transport purposes.

Secured to the junction point of the members 9 and 12 and also to the junction point of the members 10 and 13 are bearings 20 in which the axle 21 is mounted. On the ends of this axle are the wheels 22 and 23.

Near the junction point of the members 4 and 9 and also at the junction point of the members 5 and 10, are secured the bearings 25 and 24 in which the shaft 26 is rotatably mounted. This shaft has a pulley 27 secured on one of its ends, and has the saw 28 secured to the opposite end from the pulley.

Secured to the ends of the members 6 and 7 are the members 30 and 31. Near the central portion of each of the members 30 and 31 are mounted the bearings 32 and 33 for the reception of the shaft 34. The shaft 34 has pulleys 35 and 36 mounted on each of its ends and rigidly secured thereto to rotate therewith. The pulley 37 is also secured to the shaft 34 to rotate therewith and is secured on said shaft at a point inwardly from the pulley 36 and outwardly from the member 4.

Secured to the member 6 is an upstanding apertured member 40, the aperture in said member receiving the bolt 41. This bolt 41 serves as a pivot for the weight pulley frame 42, holding the weight pulley 43. An endless belt runs over the pulleys 37 and 27, and serves to drive the saw when the wheels of the automobile are brought into engagement with the pulleys 35 and 36.

The means for lifting the wheels of the automobile from the ground and pressing them against the pulleys 35 and 36 comprises the following:—

The levers 44 and 45 are pivoted on the bolts 46 and 47, the said levers having upstanding portions 49 on their forward ends. The upstanding portions have notches 48 in their upper surfaces for the reception of the housing 2. The rearmost portions of the members 44 and 45 have members 50 pivotally secured thereto by means of the bolt 53. These members 50 have notches 51 therein for engagement with the bolt 55 in the members 4 and 5 when the levers 44 and 45 are pressed down to the desired point.

The members 50 also have the notches 54 for engagement with the bolt 55 to hold the levers 44 and 45 in raised position when it is desired to remove the wood saw from engagement with the wheels of the automobile for transportation from one place to another.

A saw table 56 is pivotally mounted on the axle 21, and is held in limited space by means of the chain 57.

The method of operation is as follows:

The device is rolled underneath the rear end of an automobile to a point where the notches 48 will engage the housing for the rear axle when the levers 44 and 45 are pressed downwardly at their rear ends. When the said levers are pressed downwardly at their rear ends the notches 48 will engage the housing for the rear axle and will cause the rear wheel on the side on which the lever is depressed to be pressed against one of the pulleys 35 or 36. The lever on the opposite side will be depressed, and the device will assume the position shown in full lines in Figure 1, and when the motor runs with the clutch in gear power will be imparted to the saw thru the means above described.

Having thus fully described my invention, what I desire to protect and secure by Letters Patent is:—

1. In a power take-off means, an L-shaped inverted frame, wheels secured to the ends of the shorter legs of the said frame, a cross-piece secured to the end of the longer portions of the frame, two rotatable shafts secured on the frame, pulleys located on one of the rotatable shafts, said frame being adapted to be inserted under the rear end of an automobile, levers secured to the framework, notches in the forward portions of the levers adapted to engage the lower side of the rear axle of the automobile, the levers being adapted to raise the rear wheels of the automobile and press them upwardly and rearwardly into engagement with the pulleys located on one of the rotatable shafts mounted in the frame, both of said shafts being connected together for rotation, work performing means in operative connection with one of said shafts, both of said shafts being located at a point above the horizontal plane of the rear axle of the automobile.

2. A woodsaw attachment for automobiles comprising a rectangular frame, a supporting member secured to the forward portion of the frame, legs secured to the rear portion of the frame, wheels mounted on the lower ends of the legs, said legs and wheels being adapted to give the rectangular frame a forward incline, parallel rotatable shafts mounted in the frame, pulleys mounted on one of the shafts, work performing means mounted on the other shaft, said shafts being connected together for rotation, levers pivoted in the rectangular frame, notches in the forward portions of the levers adapted to engage the rear axle of the automobile, adjusting and holding means located on the other end portions of the levers, the levers being adapted to raise the rear wheels of the automobile and to press them rearwardly and upwardly against the pulleys mounted on the ends of one of the shafts, both of the parallel shafts being mounted at a point above a horizontal plane passing through the rear axle of the automobile, the relation and position of the parts being adapted to cause the structure when attached to the rear wheels of an automobile to form an inseparable part thereof until the operator desires to separate the frame from the automobile.

In testimony that I claim the foregoing as my own I hereby affix my signature this the 2nd day of November, 1927.

WILLIAM P. MATHEWS. [L. S.]